Sept. 28, 1954     J. H. HAYES     2,690,310
FISHING REEL
Filed March 19, 1949     3 Sheets-Sheet 3
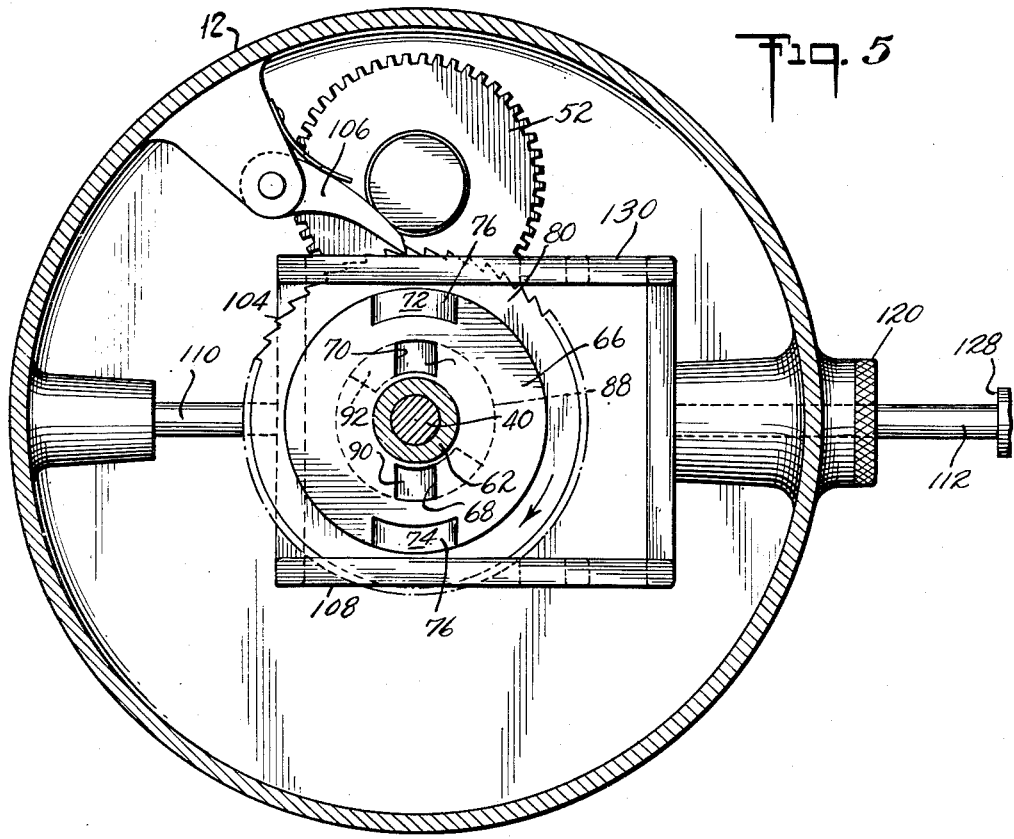
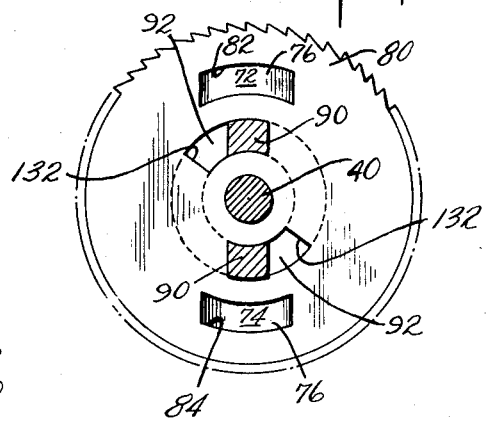
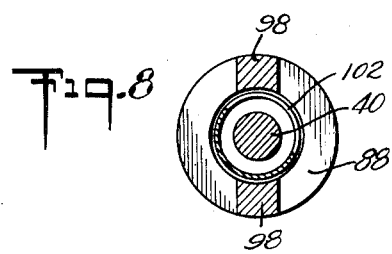
INVENTOR
JAMES H. HAYES.
BY
Curtis, Morris & Safford.
ATTORNEYS Patented Sept. 28, 1954

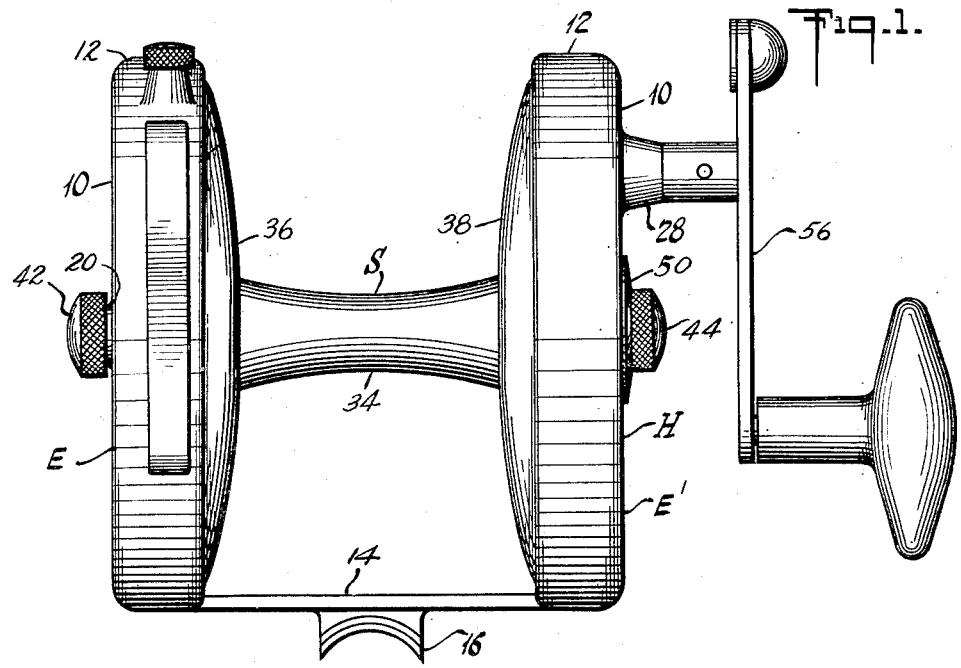

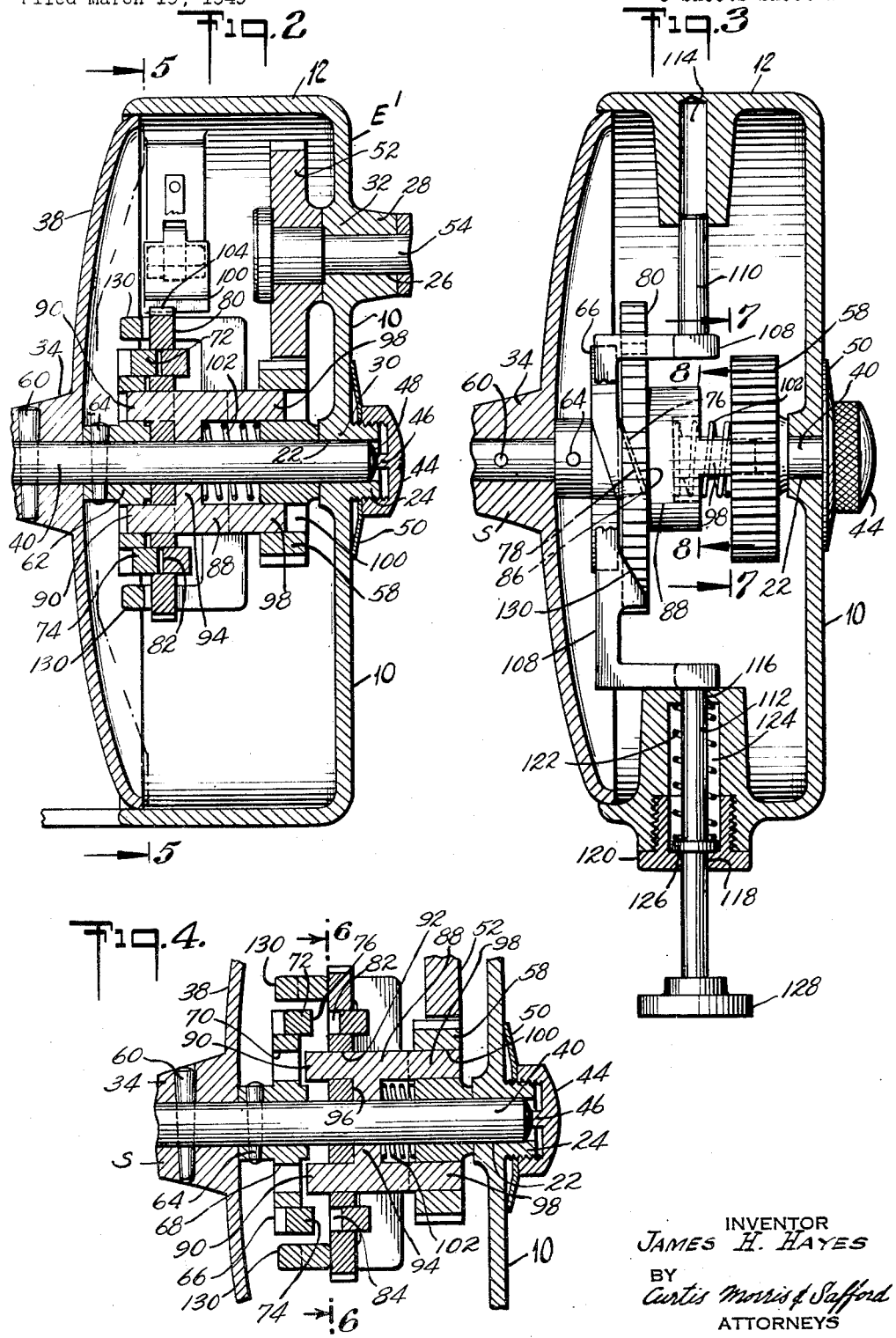

2,690,310

UNITED STATES PATENT OFFICE 2,690,310

FISHING REEL

James H. Hayes, New York, N. Y.

Application March 19, 1949, Serial No. 82,413

7 Claims. (Cl. 242—84.7)

This invention relates to a fishing reel.

A successful fishing reel must be so constructed as to meet conditions that are under the control of the operator and also to meet conditions that are unanticipatable by the operator and are created by the fish.

While the invention is not so limited in its use, I will describe it in connection with salt water fishing, and in connection with trolling or casting.

In such fishing, when casting is practiced, the reel must be so constructed that when the line is cast for from a short to a longer cast, the line must be free to unwind from the spool of the reel without any material resistance and preferably without the spool overriding the paying out of the line to cause what is known as a backlash, and to accomplish this the reel must possess what is commonly known as free-spooling, that is to say, the spool must rotate freely in its bearings without actuating sufficient of the operating parts of the reel to materially retard the free rotation of the spool.

In trolling the same free-spooling is desirable so that the line will pay out rapidly as the boat proceeds. After the cast has been completed, or the line is payed out sufficiently, in a trolling operation, the reel must be adaptable to rewind the line, which of course involves the destruction of the free-spooling and the connection of mechanism with the spool which will make it possible to rotate the spool for rewinding of the line.

When a fish is caught on the hook at the end of the line its movements are unanticipatable. It may swim toward the operator and in this event the line must be wound upon the spool at such speed that the line that extends from the spool to the fish will be taut; otherwise the fish is likely to throw the hook. This also pertains when the fish breaks water. Ofttimes when a fish is swimming toward the operator and the line is being reeled in the fish will rapidly change its direction of movement and swim away from the operator or "sound" and so the reel must be provided with means which will permit the fish to freely take the line from the spool, the actions of the operator notwithstanding.

However, there comes a point in this action of the fish where his movement away from the operator must gradually be arrested and so the reel must be provided with mechanism which will permit the fish to so swim away from the operator or sound and yet will permit the operator to gradually place a drag on the movement of the fish. These actions of the operator finally tire a game fish so that it can be brought to gaff or beached, as the case may be.

A successful reel must possess mechanism which will permit all of the actions hereinbefore set forth, but it must, in addition to that, be of such sturdy construction that it will, for a long period of time, withstand the wear and tear to which it is subjected by such actions. Moreover, it must be of such construction that it will be of light weight so that the balance of rod and reel may be such that their use will not place undue burden upon the operator or fisherman, and of course the reel possessing all of the advantages above referred to should be, if possible, relatively inexpensive.

The object of the present invention is to provide a reel that will meet all of the requirements and possess all of the advantages above outlined. With this object in view, and with other objects that will appear as the description of the invention progresses, the invention resides in the combination and arrangement of parts illustrated in the drawings, described in the specification and recited in the claims, but it will be understood by those skilled in the art that certain modifications of structure may be made without departing from the spirit of the invention or without exceeding the scope of the claims and I therefore do not wish to be limited to the particular embodiment illustrated.

In the drawings:

Figure 1 is an elevation showing one form of a reel embodying my invention;

Figure 2 is a sectional view partly broken away, the section being taken in the plane of the axis of the reel spool;

Figure 3 is a view similar to Figure 2 but taken in a plane at right angles thereto;

Figure 4 is a sectional view partly broken away in the same plane as that of Figure 2, showing the clutching and locking members in the disengaged positions;

Figure 5 is a sectional view taken on line 5—5 of Figure 2;

Figure 6 is a sectional view taken on line 6—6 of Figure 4;

Figure 7 is a sectional view taken on line 7—7 of Figure 3; and

Figure 8 is a sectional view taken on line 8—8 of Figure 3.

In the form of the invention illustrated in the drawings there is disclosed a housing and support, indicated generally by the reference letter H; a housing because it houses the operating parts of the reel and a support because it supports those parts and the spool. This housing, in the form illustrated, includes two hollow substantially cylindrical spaced end pieces, each including a plate or base 10 and an annular flange 12. These end pieces are held in parallel spaced relationship by a cross bar or bars, one of which is illustrated at 14 and which may be integral with or attached to the end pieces in any desirable manner. By one of these bars, 14, for instance, a saddle 16 is carried, by means of which the reel may be attached to a fishing pole in the usual or in any desired manner.

The plate 10 of the end piece E is provided with an externally threaded hub 20. The end piece E' is provided with a bearing opening 22 and with a similar externally threaded hub 24, both of which are in the plate 10. This plate 10 of the end piece E' is also provided with a bearing 26 and with a hub 28 through which the opening extends and which hub projects beyond the face of the plate 10. The plate 10 of the end piece E' is provided with an inwardly extending projection 30 through which the bearing opening 22 extends. This plate 10 of the end piece E' is also provided with an inwardly extending projection 32, offset or eccentric to the bearing opening 22.

A line receiving spool, indicated generally by the letter S, is provided, and this spool includes a hub 34 and flanges 36 and 38, the spool being rigid with, and supported by, an axle 40 which is mounted for rotation within the bearing opening 22 of the hub 24 and by a bearing in the hub 20 at its other end. The flanges 36 and 38 are so formed that their peripheral edges extend into the end pieces E and E' and in close proximity to the inner faces of the flanges 12 of said end pieces, as illustrated in Figs. 1 and 2.

The hub 20 is provided with an internally threaded cap 42, the threads of which engage the external threads of the hub, while the hub 24 is provided with a cap 44 that has internal threads engageable with the external threads of the hub. This hub is also provided with an axial projection 46, engaging the end 48 of the axle 42 and adapted to prevent undue endwise movement of the spool.

Interposed between the cap 44 and the adjacent face of the plate 10 of the end piece E' is a spring 50 which coacts with the cap 44 to resist its inward movement and to maintain it in its various adjusted positions.

By means of this arrangement the spool may be properly centered and the flanges 36 and 38 thereof properly located within the end pieces E and E'.

A driving gear 52 is secured to a shaft 54 that operates in the bearing 26 of the hub 28 and projects beyond the end member E' for the reception of the operating handle 56 which is suitably secured thereto. This driving gear constantly meshes with a driven gear 58 which is loosely mounted on the axle 40 within the end piece E' of the housing H.

The shaft 40 is secured to the hub of the spool by suitable means such as a pin 60 and surrounding this shaft within the housing E' is a projection 62 which is secured to the shaft or axle 40 by suitable means such as a pin 64. This projection 62 carries a clutch plate 66 rigid therewith and having a pair of openings 68 and 70 which are arranged, preferably, diametrically opposite each other. Projections 72 and 74 extend from the face of this clutch plate 66 and are preferably arranged diametrically opposite each other. These projections have cam faces 76 which incline in respect of the face of the cam, as shown at 78 in Figure 3 of the drawing.

The complemental clutch plate 80 is freely mounted on the shaft or axle 40 and is adapted to move longitudinally thereon. This clutch plate 80 is provided with cam recesses 82 and 84 which are complemental to the cams 72 and 74 and are adapted respectively to receive the same, each of the cam recesses having a cam face 86, as illustrated in Figure 3 of the drawing.

A locking member 88 is slidably mounted on the axle 40 and is provided with projections or lugs 90 which are adapted to enter and engage in the openings 68 and 70 of the cam or clutch plate 66, these projections extending through openings 92 in the clutch plate 80 and being slidable therein. This locking member 88 is provided with a flange 94 which acts as an abutment for the clutch plate 80 at 96 and which flange also acts as a bearing for the locking member. Projections 98 on the locking member extend into and are slidable in complemental openings 100 in the gear 58.

Interposed between the flange 94 and the gear 58 is a spring 102 which, using the gear 58 as a base, and bearing against the flange 94, urges the clutch plate 80 and the locking member 88 toward the cam plate 66 so that the projections 90 will engage in the openings 68 and 70 in the cam plate 66 and the cams 72 and 74 engage the cam recesses with their complemental cam faces 78 and 86 arranged as illustrated in Figure 3.

Thus, when the parts are so engaged, the rotation of the locking member 88 will cause, through interengagement with the cam plate 66, as shown in Figure 2, the rotation of the shaft or axle 40 and consequently, the rotation of the spool in the direction of "reeling in" only.

This rotation of the locking member 88 is accomplished by the interengagement of the projections 98, which are preferably diametrically opposite each other, in the complemental openings 100 in the gear 58 (Figure 2), the projections 98 having sliding movement within the openings 100 as illustrated in Figures 2 and 4.

The gear 58, being freely rotatable on the shaft or axle 40, is at all times engaged with the gear 52. The clutch plate 80 is provided with a ratchet 104 with which cooperates a pivoted spring pressed pawl 106 which is mounted on the inside of the casing E. The width of the pawl is such that when the clutch plate 80 moves from its engaging to its disengaging position or in the opposite direction, the engagement between the pawl 106 and the ratchet 104 will always be maintained.

This pawl permits the rotation of the clutch plates when the clutch plates are engaged and the spool is being turned by means of the handle and the intervening mechanism in a winding in operation, but it will prevent the clutch plate 80 from rotating when force is applied to the line by the run of a fish with the consequent rotation of the spool in the opposite direction.

Referring to Figure 5, it will be seen that the pawl 106 will permit the rotation of the clutch plate 80 when the clutch plate is being rotated in a clockwise direction through the operation of the handle and the intervening mechanism, and will prevent the rotation of the clutch plate in the opposite direction when the fish starts his run.

In order that the positive lock between the cam plate 66 and the locking member 88 may be destroyed, at the option of the user, I have provided an arbor 108 which carries studs 110 and 112, the stud 110 being slidably mounted in a bearing opening 114 and the stud 112 being mounted in bearing openings 116 and 118, the latter being provided in a removable bearing member 120. A spring 122 is located in a chamber 124 and bears at one end against the end of the chamber and at its other end against a collar 126 on the stud 112. This stud 112 extends beyond the bearing member and is provided with an operating finger base 128.

The arbor 108 carries a pair of cams 130 which are adapted to engage and ride over the face of the clutch plate 80 for the purpose of moving the clutch plate, at the option of the user, against the action of the spring 102 to disengage the projections 90 from the openings 68 and 70 in the cam plate 66, as illustrated in Figures 2 and 4.

When the parts are manually operated, as above set forth, the spool will be free at both its clutch end and its brake end and thus, free spooling may be accomplished as, for instance, in casting.

When the parts are in the position illustrated in Figures 2 and 3 however, a turning of the operating handle on the gear shaft will, through the gearing to the spool shaft 40, rotate the shaft through the interengaged locking member 88 and cam plate 66.

If a fish strikes, however, and starts his run, the cam faces 78 of the cams 72 and 74 will ride upon the cam faces 86 of the cam recesses 82 and 84 and will thus force the clutch plate 80 against the action of the spring 102 until the projections 90 of the locking member 88 are forced from the openings 68 and 70. During this action the operating handle 56 is permitted to and does move slightly backwardly. The fish will thereafter be permitted to continue his run irrespective of any "reeling in" action applied to the gear through the operating handle. As the fish starts his run, thus rotating the shaft 40 in an unwinding direction, a small backward movement of locking member 88, driven gear 58 and driving gear 52 occurs until these gears and the locking member 88 are free of positive connection with cam plate 66, as described.

Referring particularly to Figures 5 and 6, it will be seen that the lengths of the lost motion slots 92 in the intermediate or complemental clutch plate 80 are greater than the widths of the projections 90 of locking member 88 which pass through these slots and engage openings 68 and 70 of the clutch or cam plate 66. Thus as the fish causes the shaft 40 and cam plate 66 to rotate in an unwinding direction (i. e. counterclockwise in Fig. 5), the projections 90 travel to the opposite ends of the lost motion slots 92; during this travel, complemental clutch plate 80 is prevented from backward or counterclockwise rotation by pawl 106. As this relative movement occurs between clutch plate 66 and complemental clutch plate 80, the cams 72, 74 on clutch plate 66 force plate 80 and locking member 88 towards driven gear 58, thus withdrawing projections 90 from the openings 68, 70 and allowing shaft 40 to "free spool," subject only to the operation of a brake, if used. When the fish's run is completed, the user reels in and projections 90 again travel to the opposite ends of their lost motion slots 92; this permits spring 102 to force locking member 88 and complemental clutch plate 80 to move towards cam plate 66. When this occurs and projections 90 are aligned with openings 68 and 70, the projections enter these openings and positive engagement of the train of gears, for reeling in, is reestablished with cam plate 66. During the initial reeling in operation, the frictional engagement of pawl 106 under the influence of its spring against the ratchet 104 of complemental clutch plate 80 is sufficient to maintain the plate 80 stationary while projections 90 travel to the opposite ends of the lost motion slots 92.

During the run of the fish, free action of the spool will continue without the projections 90 again locking the locking member 88 and the cam plate 66 together because of the lengths of the projections and because of the fact that the cams 72 and 74 do not, during the rotation of the spool, drop completely into the cam recesses 82 and 84.

Should it be desired to stop the run of the fish, the brake which has heretofore been referred to may be applied to the degree desired. As described above, the progress of the fish being slowed up, the spring 102 will come into play and force the projections 90 into the openings 68 and 70 in the cam plate 66 and the locking member 88 will carry with it the clutch plate 80 so that the cams 72 and 74 in the cam plate 66 will again drop into and engage within the recesses 82 and 84 in the clutch plate 80 with the cam surfaces 78 and 86 in the positions illustrated in Figure 3 in which positions positive rotation may be imparted to the spool through the operating gearing and handle. However, should the fish repeat its run, the free action of the spool heretofore described will repeat itself.

While I have described and illustrated a particular embodiment of my invention it will be realized that many changes may be made in the details of construction without departing from the spirit of my invention or exceeding the scope of the claims, and therefore I do not wish to be limited to the particular embodiment illustrated. This embodiment is simply for the purpose of showing the best form of my invention known to me at the present time and to comply with the statute.

What I claim is:

1. In a fishing reel having a spool, means for rotatively supporting said spool, and an actuating gear for said spool, the improvement which comprises a clutch plate rigidly secured to said spool, a complemental clutch plate rotatable independently of said spool and engageable with and disengageable from said first mentioned clutch plate by movements axially of said spool, a locking member rotatively driven by said actuating gear and movable axially of both said clutch plates and said gear, said locking member being selectively engageable with and disengageable from said first mentioned clutch plate, means for resiliently urging said locking member against said complemental clutch plate and into locking engagement with said first mentioned clutch plate for driving said spool in a reeling in direction, means on said complemental clutch plate to permit small relative rotative movement between said locking member and said complemental clutch plate, means to prevent rotation of said complemental clutch plate in an unreeling direction, and cooperating cam means on said clutch plates to move said complemental clutch plate and said locking member away from said first mentioned clutch plate against the action of said resilient means to disengage said locking member from said first mentioned clutch plate.

2. In a fishing reel having a spool, means for rotatively supporting said spool, and an actuating gear for said spool, the improvement which comprises a clutch plate rigidly secured to said spool, a complemental clutch plate rotatable independently of said spool and engageable with and disengageable from said first mentioned clutch plate by movements axially of said spool, a locking member rotatively driven by said actuating gear and movable axially of both said clutch plates and said gear, said locking member being selectively engageable with and disengageable from said first mentioned clutch plate, means for resiliently urging said locking member against said complemental clutch plate and into locking engagement with said first mentioned clutch plate for driving said spool in a reeling in direction, lost motion slot means on said complemental clutch plate to permit small relative rotative movement between said locking member and said complemental clutch plate, means to prevent rotation of said complemental clutch plate in an unreeling direction, and cooperating cam means on said clutch plates to move said complemental clutch plate and said locking member away from said first mentioned clutch plate against the action of said resilient means to disengage said locking member from said first mentioned clutch plate.

3. A fishing reel according to claim 1 having manually controlled means for selectively rendering said locking member inoperative to lock said clutch plates together.

4. A fishing reel according to claim 1 having manually controlled means for selectively rendering said locking member inoperative to lock said clutch plates together, and automatically operable means for rendering said last mentioned means inoperative when force manually applied thereto is relieved.

5. In a fishing reel having a spool, and means including a main shaft rotatively supporting said spool, a gear train for rotating said spool in a reeling in direction, means for selectively transmitting rotative movement to said spool from said gear train in said reeling in direction including a pair of clutch members, one of said clutch members being rigid with said spool and the other being free to rotate with relation to said spool and a locking member slidably and rotatively engaged with said gear train and with said freely rotatable clutch member and selectively engageable with and disengageable from said clutch member which is rigid with said spool, resilient means for normally urging said locking member into locking relation with said last mentioned clutch member, cooperating cam members on said clutch members for disengaging said locking member from said clutch member that is rigid with said spool against the action of said resilient means when said spool is rotated in an unreeling direction, and means for preventing the rotation of said freely rotatable clutch member in an unreeling direction of said spool.

6. A fishing reel according to claim 5 wherein said clutch members and said locking member are mounted axially on said main shaft and said locking member and said freely rotatable clutch member are movable axially thereon.

7. A fishing reel according to claim 6 wherein said freely rotatable clutch member and locking member have slight rotative movements relative to each other to permit the relative rotation of said clutch members during the disengagement of the locking member from said clutch member that is fixed in relation to said spool during the axial movement of said free clutch member under the influence of said cam members.

References Cited in the file of this patent

UNITED STATES PATENTS

| Number | Name | Date |
| --- | --- | --- |
| 214,495 | Dickson | Apr. 22, 1879 |
| 384,309 | Cordes | June 12, 1888 |
| 478,327 | Hendryx | July 5, 1892 |
| 929,867 | Meisselbach et al. | Aug. 3, 1909 |
| 1,265,038 | Bieman | May 7, 1918 |
| 1,554,786 | Case | Sept. 22, 1925 |
| 1,765,903 | Case | June 24, 1930 |
| 1,836,755 | Hirsch | Dec. 15, 1931 |
| 2,026,665 | Beasley | Jan. 7, 1936 |
| 2,054,823 | King | Sept. 22, 1936 |
| 2,097,295 | Pierre | Oct. 26, 1937 |
| 2,184,149 | Marr | Dec. 19, 1939 |
| 2,329,982 | Coxe | Sept. 21, 1943 |
| 2,364,047 | Bardon | Dec. 5, 1944 |
| 2,417,732 | Bland et al. | Mar. 18, 1947 |
| 2,536,288 | Hurd | Jan. 2, 1951 |

FOREIGN PATENTS

| Number | Country | Date |
| --- | --- | --- |
| 561,010 | Great Britain | May 1, 1944 |